(12) United States Patent
Paulus et al.

(10) Patent No.: US 8,837,042 B2
(45) Date of Patent: Sep. 16, 2014

(54) TRANSILLUMINATION DEVICE FOR A MICROSCOPE

(75) Inventors: Robert Paulus, Hergatz (DE); Harald Schnitzler, Lüchingen (CH); Didier Henry, Lustenau (AT)

(73) Assignee: Leica Microsystems (Schweiz) AG, Heerbrugg (CH)

( * ) Notice: Subject to any disclaimer, the term of this patent is extended or adjusted under 35 U.S.C. 154(b) by 253 days.

(21) Appl. No.: 13/359,226

(22) Filed: Jan. 26, 2012

(65) Prior Publication Data
US 2012/0200905 A1 Aug. 9, 2012

(30) Foreign Application Priority Data

Feb. 3, 2011 (DE) .................. 10 2011 003 603

(51) Int. Cl.
G02B 21/06 (2006.01)
G02B 26/02 (2006.01)
G02B 21/08 (2006.01)
G02B 21/02 (2006.01)
G02B 21/22 (2006.01)
G02B 21/12 (2006.01)

(52) U.S. Cl.
CPC ............ *G02B 21/086* (2013.01); *G02B 21/025* (2013.01); *G02B 21/22* (2013.01); *G02B 21/125* (2013.01); *G02B 26/02* (2013.01)
USPC ............................. 359/368; 359/227; 359/385

(58) Field of Classification Search
USPC ............ 359/227, 233, 385, 388, 390, 739; 362/575, 227, 572, 602, 613, 623
See application file for complete search history.

(56) References Cited

U.S. PATENT DOCUMENTS

| | | | | |
|---|---|---|---|---|
| 4,521,076 A | * | 6/1985 | Weber et al. | 359/739 |
| 5,239,178 A | * | 8/1993 | Derndinger et al. | 250/234 |
| 5,299,053 A | * | 3/1994 | Kleinburg et al. | 359/227 |
| 6,657,796 B2 | * | 12/2003 | Greenberg | 359/738 |
| 6,934,079 B2 | * | 8/2005 | Hell et al. | 359/368 |
| 7,088,487 B2 | * | 8/2006 | Lauer | 359/233 |
| 7,273,298 B2 | | 9/2007 | Laschke et al. | |
| 7,345,815 B2 | | 3/2008 | Shimizu et al. | |
| 7,554,727 B2 | | 6/2009 | Shimizu et al. | |
| 7,660,045 B2 | * | 2/2010 | Yoshimine | 359/656 |
| 7,787,179 B2 | * | 8/2010 | Lippert et al. | 359/385 |
| 2004/0212900 A1 | | 10/2004 | Seita | |
| 2009/0303582 A1 | | 12/2009 | Karasawa | |
| 2010/0302630 A1 | * | 12/2010 | Paulus | 359/385 |

FOREIGN PATENT DOCUMENTS

| | | |
|---|---|---|
| DE | 102004017694 | 9/2005 |
| DE | 102007040839 | 3/2008 |
| DE | 1020070005790 | 8/2008 |
| DE | 102011003568 B4 | 8/2012 |
| DE | 102011003569 B4 | 8/2012 |
| JP | 200375725 | 12/2003 |
| JP | 61-177418 | 9/2009 |

\* cited by examiner

Primary Examiner — Frank Font
(74) Attorney, Agent, or Firm — Hodgson Russ LLP (57) ABSTRACT

A transillumination device (150) for a microscope (100) comprises a flat panel light source (151), a diaphragm arrangement (152) arranged behind the flat panel light source (151) in the radiating direction (AR) that comprises two diaphragm elements movable relative to one another, at least one of the two diaphragm elements having a cutout, the two diaphragm elements defining, together with the at least one cutout, a diaphragm opening, wherein the dimensions of the diaphragm opening in two mutually perpendicular directions are determined by the position of the diaphragm elements relative to one another.

21 Claims, 10 Drawing Sheets

TRANSILLUMINATION DEVICE FOR A MICROSCOPE

CROSS REFERENCE TO RELATED APPLICATIONS

This application claims priority of German patent application number 10 2011 003 603.2 filed Feb. 3, 2011, the entire disclosure of which is incorporated by reference herein.

FIELD OF THE INVENTION

The present invention relates to a transillumination device (so-called "transmitted-light base") having an integrated flat panel light source, for microscopes, in particular for those having a continuously modifiable magnification, called "zoom microscopes" for short, in particular stereomicroscopes or macroscopes; and to a microscope having a transillumination device of this kind

BACKGROUND OF THE INVENTION

A variety of transillumination devices having an integrated flat panel light source are known in the existing art. These are used for bright-field, dark-field and/or oblique illumination types.

JP 2003-75725 A shows a combined transmitted bright-field and transmitted dark-field illumination device in which it is possible to switch over between bright-field and dark-field illumination by corresponding application of control to numerous LEDs.

In particular for viewing low-contrast specimens, illumination with diffuse light is not sufficient to depict the relevant details. A variety of actions are known in the existing for increasing the contrast. The illumination method is of particular importance especially in stereomicroscopy, since it is used to generate contrasts on the object being viewed that make structures on the object more visible, or indeed visible at all.

U.S. Pat. Nos. 7,345,815 B2 and 7,554,727 B2 describe the use, in the context of bright-field illumination, of light-directing elements that control the illumination angle of the sample. The fact that the maximum field is always illuminated has, however, a negative effect on contrast.

DE 10 2004 017 694 B3 describes a segmentation of the light source, the position and gap width of a slit aperture being varied. Oblique illumination is possible. The rectangular shape of the slit is, however, not ideal for the circumstances in a stereomicroscope having the two observation channels at an angle to one another. Operability, and the construction of the slit aperture, also need to be improved.

It is therefore desirable to describe a maximally flat transillumination device for homogeneous illumination of a microscope, which device can be used for bright-field, dark-field, and/or oblique illumination.

SUMMARY AND ADVANTAGES OF THE INVENTION

Against this background, the present invention proposes a transillumination device having the features of claim 1, and a microscope having a transillumination device of this kind Advantageous embodiments are the subject matter of the dependent claims and of the description that follows.

The invention combines the flat conformation of a flat panel light source with the specific configuration of a diaphragm arrangement arranged thereabove, in order to make available a flat, physically compact transillumination base that reproducibly offers a plurality of different illumination types and illumination angles simultaneously with simple operability. The diaphragm arrangement comprises two diaphragm elements movable relative to one another, in particular along a first movement direction, at least one of which has a cutout in order to define a diaphragm opening. The diaphragm opening can be characterized by its respective dimension in two mutually perpendicular directions. The light of the flat panel light source located below passes through the diaphragm opening and illuminates a sample arranged thereabove in the microscope beam path.

According to a particularly preferred embodiment of the invention, the at least one cutout is shaped so that upon a modification of the relative position of the diaphragm elements with respect to one another along the first movement direction, the dimension of the diaphragm opening is modified more greatly in the first movement direction than in the direction perpendicular thereto. If the movement direction is to be defined hereinafter (without limitation) as a "N-S" ("North-South") direction, then a relative movement in the N-S direction causes a greater modification of the N-S dimension of the diaphragm opening than of the E-W ("East-West") dimension. It has been shown that a cutout shape that is axially symmetrical with respect to the movement direction is suitable for reaching this goal, and is also easy to manufacture. The at least one cutout is preferably at least locally concave, circular, parabolic, and/or hyperbolic. These shapes can be manufactured particularly easily.

The differing dimensional modifications make it possible, in particular, to take into account the two-channel beam geometry of stereomicroscopes in the transillumination device having an integrated flat panel light source. The flat panel light source is located just below the sample plane but not in it, so that the two observation beams of the stereomicroscope, which are located on one another in the sample, then diverge again and are located more or less alongside one another on the flat panel light source. Vignetting-free illumination can be provided by way of a corresponding geometry of the diaphragm opening, in particular an envelope of the adjacently located beam diameters of the two stereo channels, although (in particularly advantageous fashion) only the opening necessary for vignetting-free illumination of the field of view or of the observable portion of the object can be uncovered, and contrast-reducing flare is thereby reduced.

Advantageously, the two diaphragm elements are embodied as flexible diaphragm curtains. These diaphragm curtains are notable for the fact that they are thin, made of a flexible material, and extend in planar fashion over the flat panel light source. This embodiment is particularly space-saving because flexible diaphragm curtains can be guided relatively freely. It is advantageous in particular to roll up the diaphragm curtains or to guide them through laterally past the flat panel light source and then under the flat panel light source. A further possibility is also to embody the two diaphragm elements as rigid diaphragm plates that are displaceable relative to one another. This yields robust, less-sensitive diaphragm elements.

Flexible but also rigid diaphragm elements can be moved particularly advantageously by means of diaphragm element shafts. For example, the diaphragm elements can be rolled onto them and unrolled from them. This configuration is particularly compact and relatively stable. The diaphragm opening can be adjusted and/or positioned particularly simply and, in particular, reproducibly by shifting the diaphragm element shafts into specific angular positions.

Flat panel light sources particularly preferred for the invention are described in the applications DE 10 2011 003 568.0 (corresponding to U.S. application Ser. No. 13/359,165 and DE 10 2011 003 569.9 (corresponding to U.S. application Ser. No. 13/359,193 of the same date, the entire disclosures of which are incorporated herein by reference. A flat panel light source of this kind comprises a plate-shaped light guide having a lower boundary surface, an upper boundary surface, and at least one lateral surface, as well as at least one light-emitting means which is arranged so that it radiates light from at least two different directions via at least one lateral surface, serving as a light entrance surface, into the light guide in such a way that the light propagates in the light guide as a result of total reflection. In the case of a light guide shaped like a prism or a truncated pyramid, for example, i.e. a light guide having a polygonal base surface, incoupling occurs at at least two of the lateral surfaces. In the case of a cylindrical or frustoconical light guide, i.e. a light guide having an elliptical base surface, incoupling occurs at at least two locations on the enveloping surface that are preferably distributed evenly over the circumference. Incoupling from the side moreover allows a low overall height. Total reflection is disrupted in defined fashion by an element abutting against a contact surface at the lower boundary surface, facing away from the sample, of the light guide, so that the light incident upon the contact surface is for the most part deflected upward, and outcoupling of light occurs on the upper boundary surface of the light guide. The planar area of the contact surface is smaller than the planar area of the lower boundary surface. The element that disrupts total reflection can bring about diffuse scattering or directed reflection of the light propagating in the light guide.

The use of other flat panel light sources is likewise possible, in particular those constructed on the basis of OLEDs.

Usefully, a dark-field illumination device is additionally arranged behind the diaphragm arrangement in the emission direction toward the sample, A dark-field illumination can thus also be generated in addition to oblique and bright-field illumination. The arrangement behind the diaphragm arrangement allows the diaphragm opening to be completely closed in the context of dark-field illumination. A light-scattering and/or fluorescing property of the illuminating means (e.g. LEDs) used in bright-field illumination situations is disruptive specifically when the overall height of the illumination device is low, so that in order to achieve high-quality dark-field contrast it is advantageous to cover these illuminating means even when they are switched off.

A preferred embodiment of the transillumination device possesses a controller and at least one drive system, for example a stepping motor, in order to bring about the relative movement of the diaphragm elements. The controller can in this case be set up so that specific diaphragm positions are preassigned (stored) and can be retrieved and, usefully, also saved by the user. Motorized operation simplifies handling and results in reproducible illumination methods.

An operating means connected to the controller is preferably provided, the controller being set up to shift the diaphragm elements into a specific relative position upon an actuation of the operating means. These relative positions can be ones predetermined upon manufacture and/or by the user during operation. The user is preferably given the capability for influencing the illumination settings. By modifying setting parameters (e.g. using one or more rotary knobs to apply control to the at least one drive system), it is possible to select a specific diaphragm setting (e.g. a diaphragm trims off two-thirds of the diameter of the pupil). This can then be stored in the controller, and is available for later retrieval.

Usefully, the controller is set up to shift the diaphragm elements into a specific relative position as a function of a microscope parameter, for example a magnification set on the microscope. The axial position of the pupils of a zoom microscope is generally not fixed. Depending on the magnification, the conjugated plane of the objective pupil migrates from the plane of the diaphragm elements (high magnification) to large distances below the plane of the flat panel light source (low magnification). If the conjugated plane of the objective pupil is located in the plane of the diaphragm elements, uniform pupil manipulation over the object field can be implemented. The greater the distance of the objective pupil from the diaphragm plane, the more pronounced the effect of a manipulation of the object field (vignetting). Depending on the pupil position, which is determined by the zoom setting and objective, suitable diaphragm settings are stored in the controller in order to avoid excessive vignetting. Alternatively or additionally, the diaphragm opening is preferably also adapted in the context of a change in an iris diaphragm setting and/or an objective setting, thus dynamically tracking the optical configuration of the microscope.

Further advantages and embodiments of the invention are evident from the description and the appended drawings.

It is understood that the features recited above and those yet to be explained below can be used not only in the respective combination indicated, but also in other combinations or in isolation, without leaving the context of the present invention.

DESCRIPTION OF THE FIGURES

The invention is schematically depicted in the drawings on the basis of exemplifying embodiments, and will be described in detail below with reference to the drawings.

FIG. 8b is a plan view of a portion of FIG. 8a.

FIG. 9b is a plan view showing a portion of FIG. 9a.

FIG. 12b is a cross-sectional view of the flat panel light source in accordance with FIG. 12a.

DETAILED DESCRIPTION OF THE INVENTION

In the Figures, identical elements are labeled with identical reference characters and, for the sake of clarity, are not explained more than once.

Figure 1:
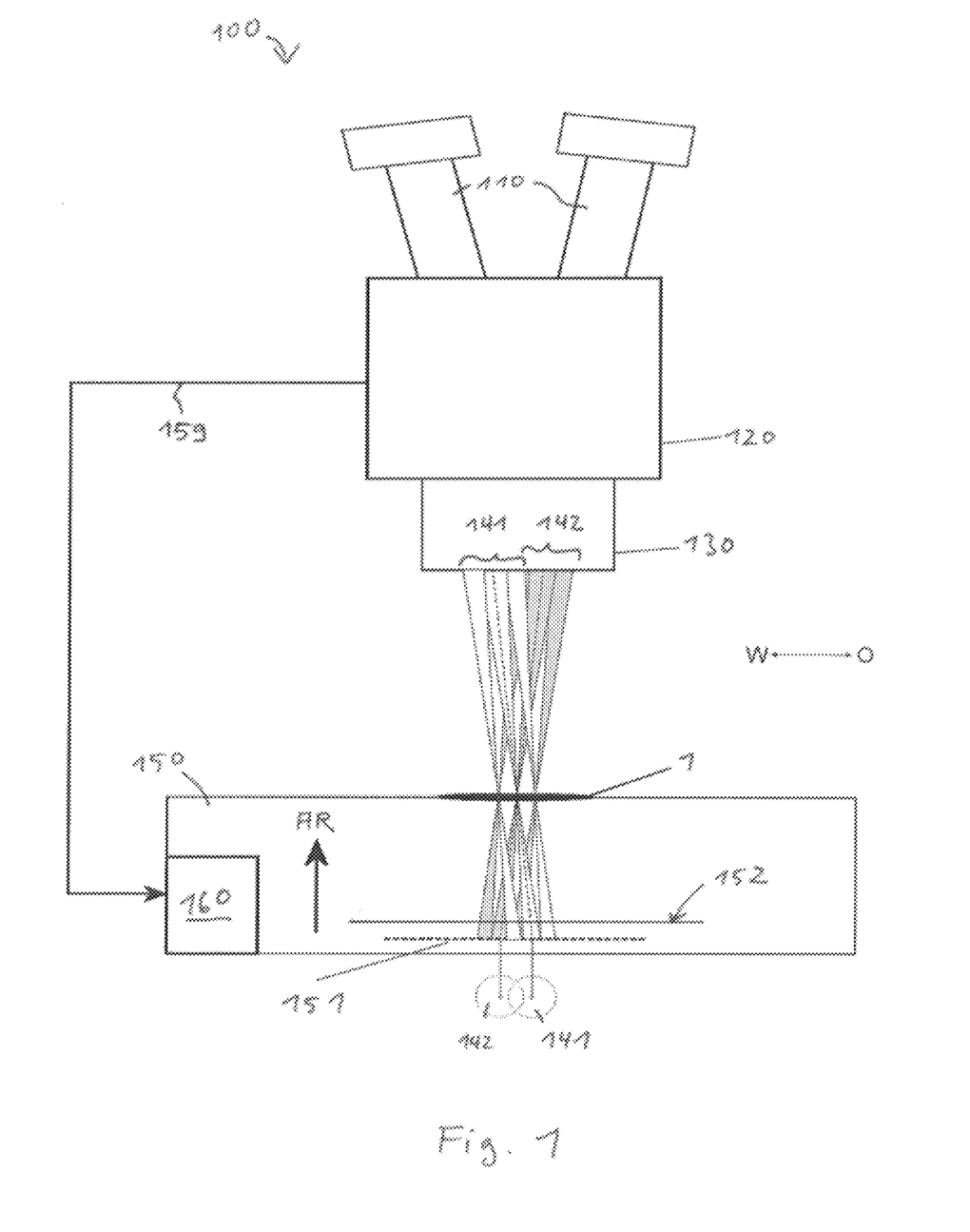
FIG. 1 is a schematic sectioned view of the circumstances at low magnification in a microscope according to the present invention.

FIG. 1 schematically depicts, in a sectioned view, a preferred embodiment of a microscope embodied here as stereomicroscope 100. Microscope 100 is equipped with a preferred embodiment of a transillumination device 150 according to the present invention. The microscope is used for examination of an object or sample 1.

Microscope 100 encompasses two eyepieces 110 that are arranged down-stream from a zoom system 120. Object 1 is viewed through an objective 130. Exemplifying beam paths 141, 142 for the two stereo channels (i.e. for the left and the right eye) are depicted proceeding from objective 130 to sample 1 and on into transillumination device 150. The left channel is labeled 141, and the right channel 142. In the drawing, the observation channels are located next to one another in a W-E direction in the drawing plane. The N-S direction, on the other hand, extends into the drawing plane.

Transillumination device 150 possesses a flat panel light source 151 and a diaphragm arrangement 152 arranged behind flat panel light source 151 in an emission direction AR. Diaphragm arrangement 152 possesses two diaphragm elements 153 and 154 movable relative to one another. In the present embodiment, the relative movement is realized by the fact that diaphragm elements 153 and 154 are displaceable in a N-S direction. In this context, one diaphragm element 154 is arranged above the drawing plane, and one diaphragm element 153 below the drawing plane. This arrangement will become more apparent in FIGS. 3 to 5.

Observation channels 141, 142 for the observation of all object points extend from objective 130 through sample 1 to flat panel light source 151, where they overlap to a relatively large extent at the low magnification depicted here. The circles below the flat panel light source are not part of the arrangement, but merely symbolize the areas on the flat panel light source used by the observation channels.

Figure 8A:
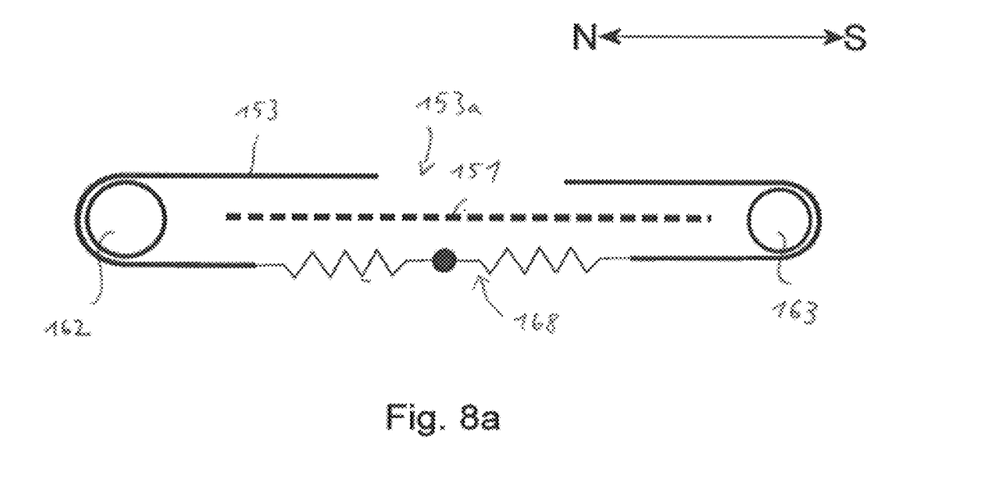
FIG. 8a is a schematic side view of a first preferred embodiment of a transillumination device according to the present invention.
Figure 8B:
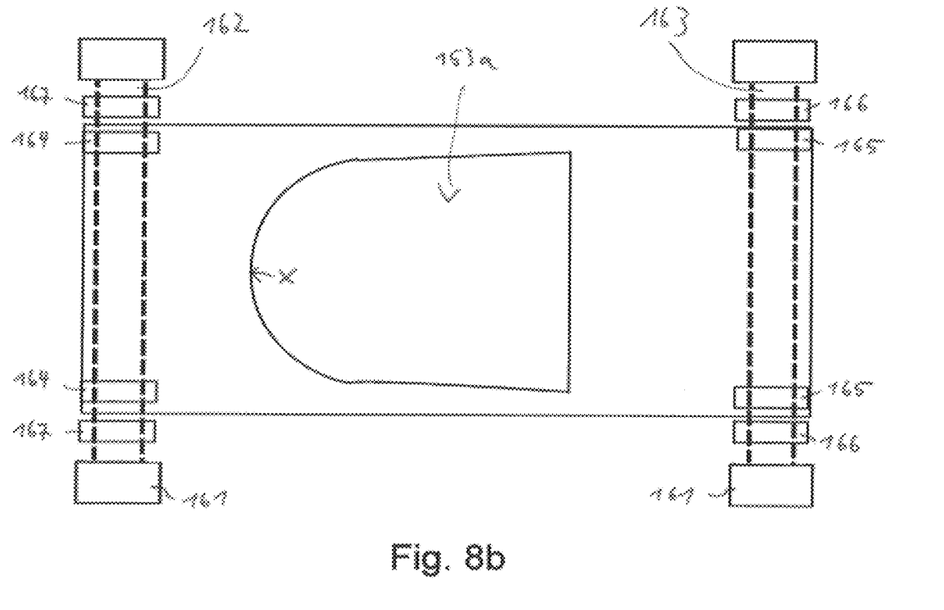
Figure 9A:
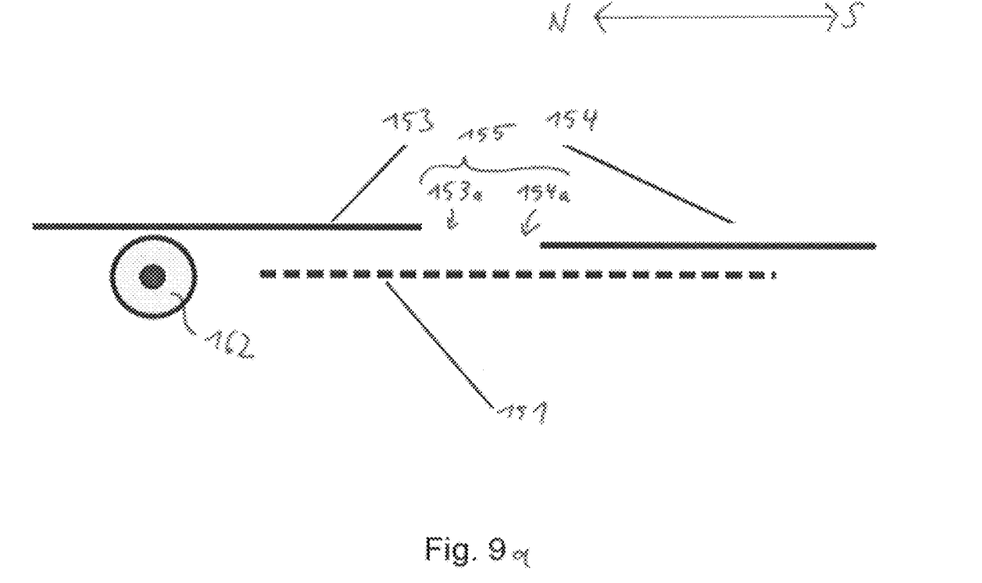
FIG. 9a is a schematic side view of a second preferred embodiment of a transillumination device according to the present invention.
Figure 9B:
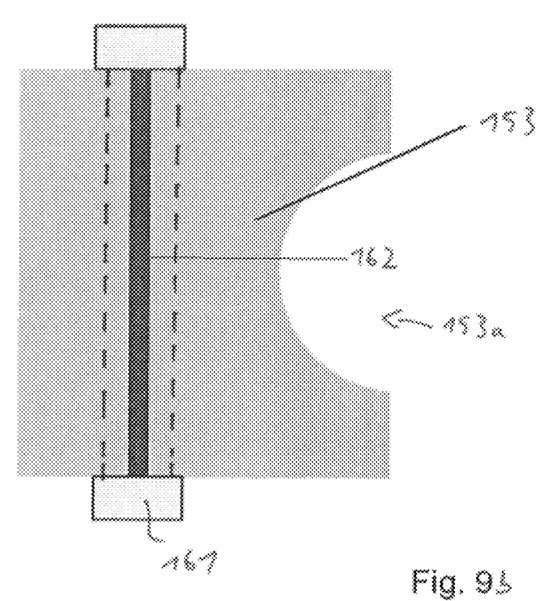

Transillumination device 150 is furthermore equipped with a computation unit 160 constituting a controller, which is connected (connection not depicted) to diaphragm arrangement 152 in order to apply control to the drive systems (cf. 161 in FIGS. 8b, 9b). Transillumination device 150 is integrated into microscope 100 in such a way that data of the built-in system components (zoom unit, current magnification, objective, etc.) are transferred, for example via a bus system 159, to controller 160.

Figure 2:
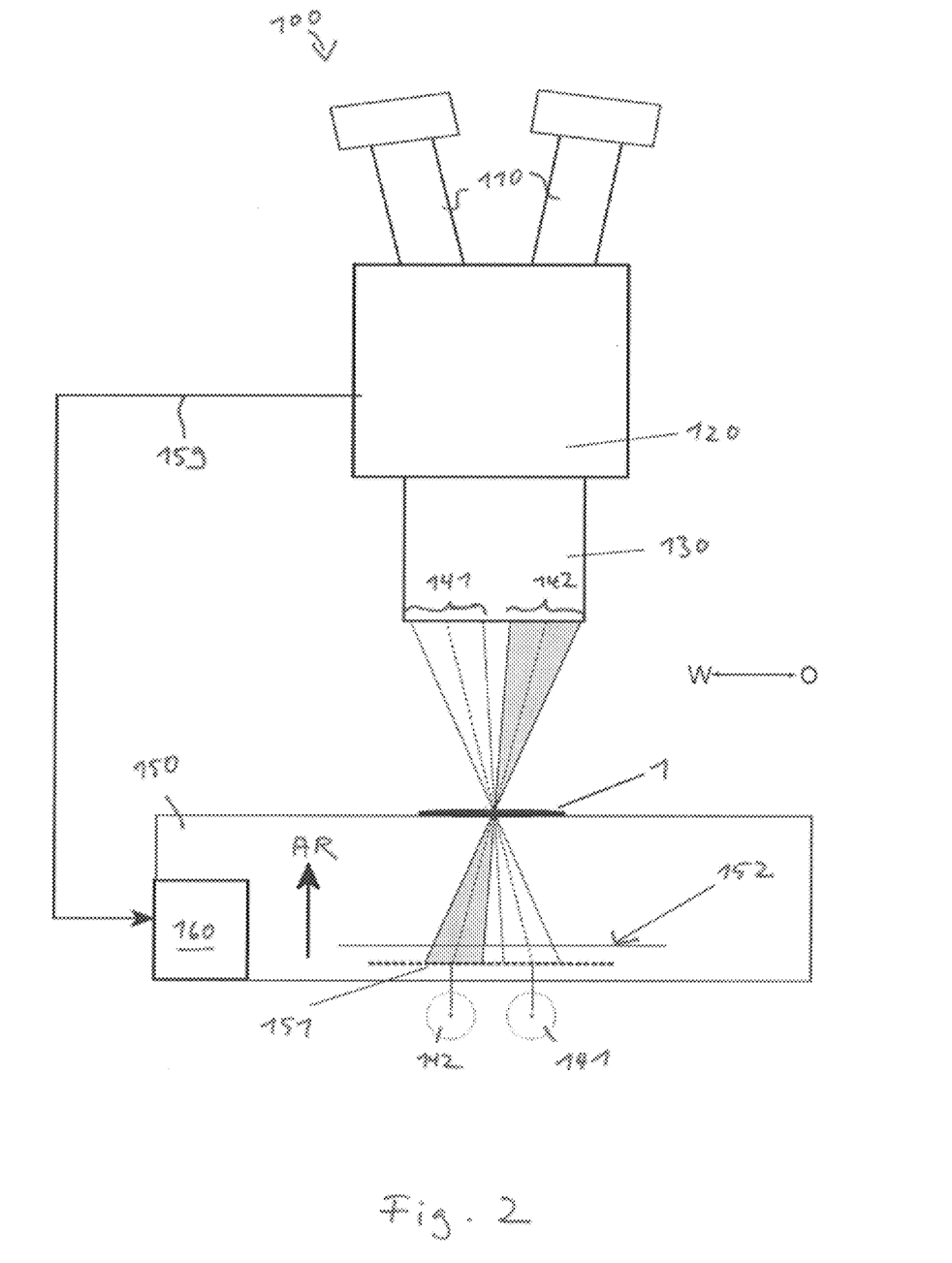
FIG. 2 is a schematic sectioned view of the circumstances at high magnification in a microscope according to the present invention.

In FIG. 2, microscope 100 in accordance with FIG. 1 is depicted in a context of high magnification. It is evident that the two observation channels 141 and 142 have migrated considerably apart from one another and have now ended up arranged substantially alongside one another on flat panel light source 151.

Figure 3:
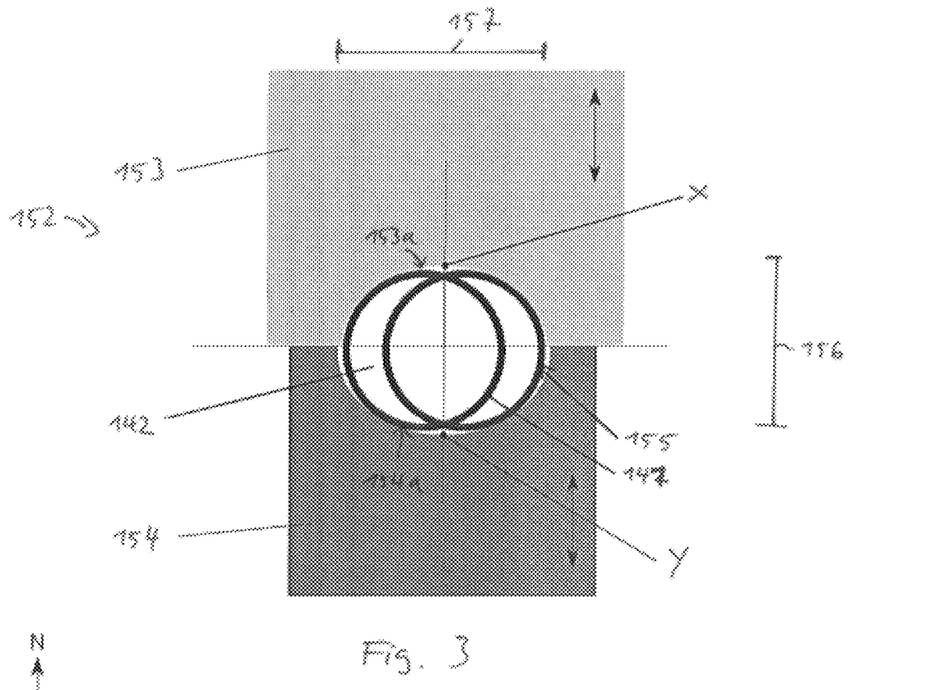
FIG. 3 is a schematic plan view of a diaphragm setting, preferred for a situation in accordance with FIG. 1, of a transillumination device according to the present invention.
Figure 4:
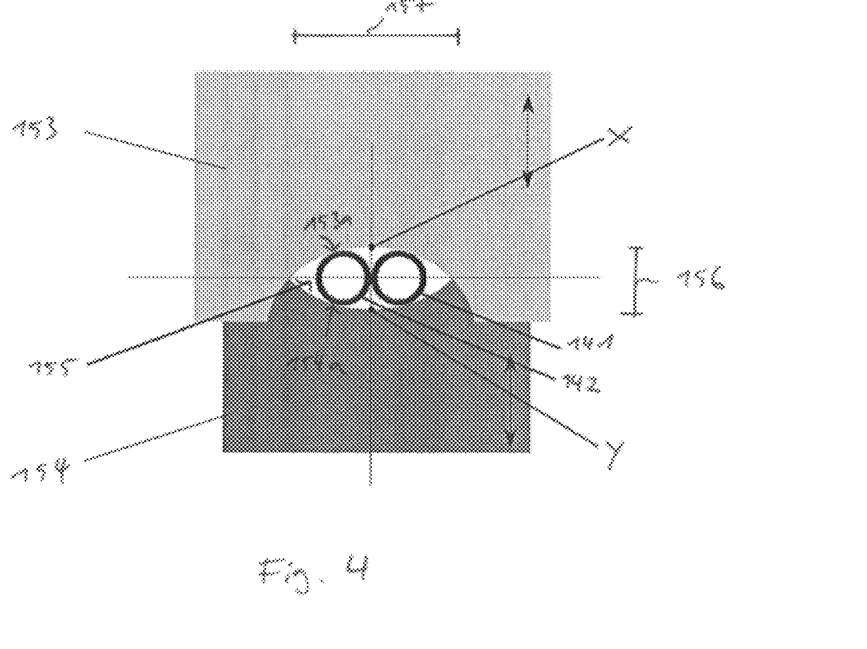
FIG. 4 is a schematic plan view of a diaphragm setting, preferred for a situation in accordance with FIG. 2, of a transillumination device according to the present invention.
Figure 5:
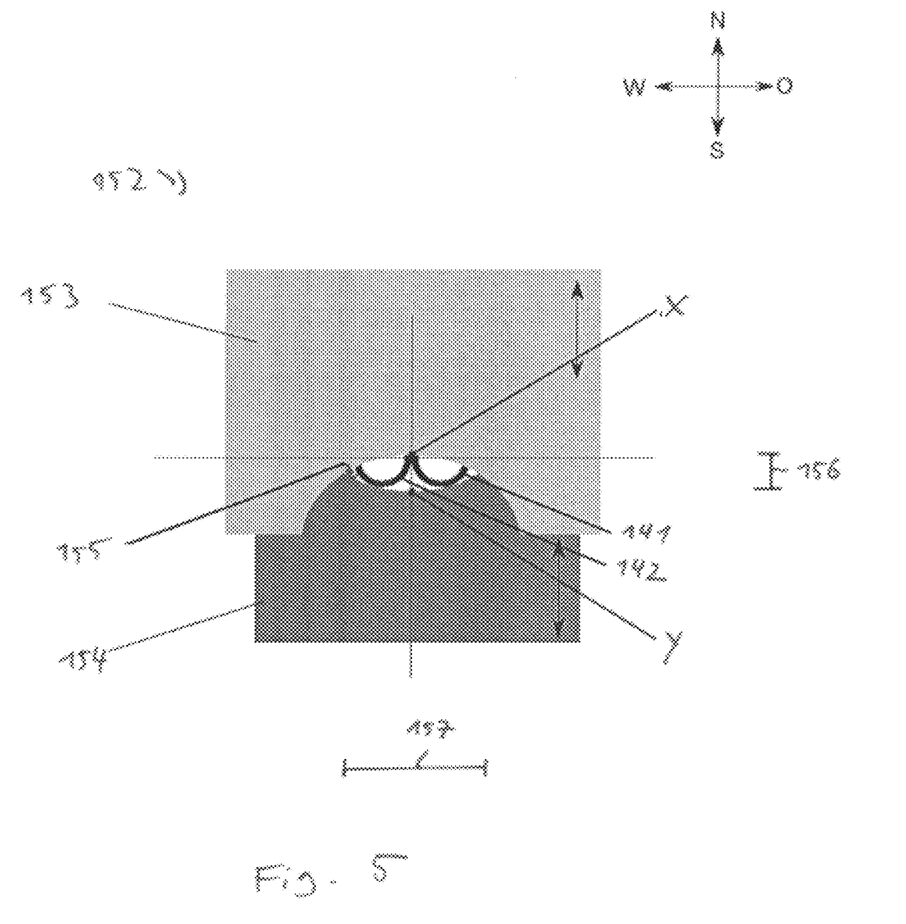
FIG. 5 is a schematic plan view of a diaphragm setting, preferred for an oblique illumination, of a transillumination device according to the present invention.

FIG. 3 depicts diaphragm arrangement 152 encompassing diaphragm elements 153 and 154 of FIG. 1, and FIG. 4 depicts the diaphragm arrangement of FIG. 2, in each case in a plan view. FIG. 5 depicts a diaphragm position for implementing oblique illumination.

The diaphragm elements are displaceable or movable relative to one another in a N-S direction. In particular, each of diaphragm elements 153, 154 is displaceable in a N-S direction. The shape of the diaphragm elements is also particularly evident in these Figures. In the present embodiment, each of diaphragm elements 153, 154 encompasses a respective cutout 153a, 154a.

Cutouts 153a, 154a are each provided on the side facing toward the other diaphragm element, and have a substantially concave shape that is symmetrical with respect to a center axis extending in a N-S direction. The diaphragm elements define, with their cutouts, a diaphragm opening 155 having a first dimension 156 in a N-S direction and a second dimension 157 perpendicular thereto, i.e. in a W-E direction.

The size of diaphragm opening 155 can be defined by a movement of diaphragm elements 153 and 154 relative to one another. In particular, cutouts 153a and 154a are shaped so that a relative movement of the diaphragm elements in a N-S direction modifies first dimension 156 more greatly than second dimension 157, which is evident from a comparison of FIGS. 3 and 4. This allows particularly good adaptation to the two-channel circumstances in a stereomicroscope. Homogeneous illumination and good contrast with little flare are obtained, since essentially only the areas on the light source that are used by the observation channels are uncovered by the diaphragm arrangement.

The respective position of the aperture elements 153, 154 can be characterized by the position of cutout points X and Y (see FIGS. 3 to 5) that lie on the axis of symmetry.

Figure 6:
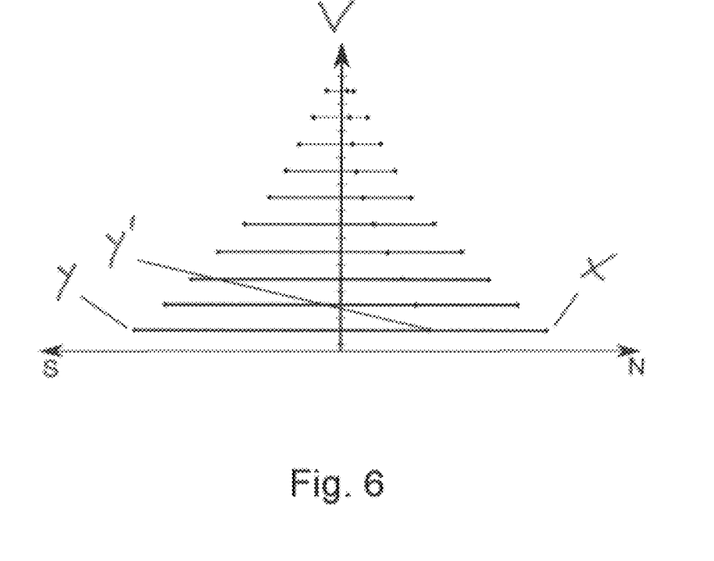
FIG. 6 shows a plot of different preferred diaphragm positions for different magnifications which can be stored in a controller.
Figure 7:
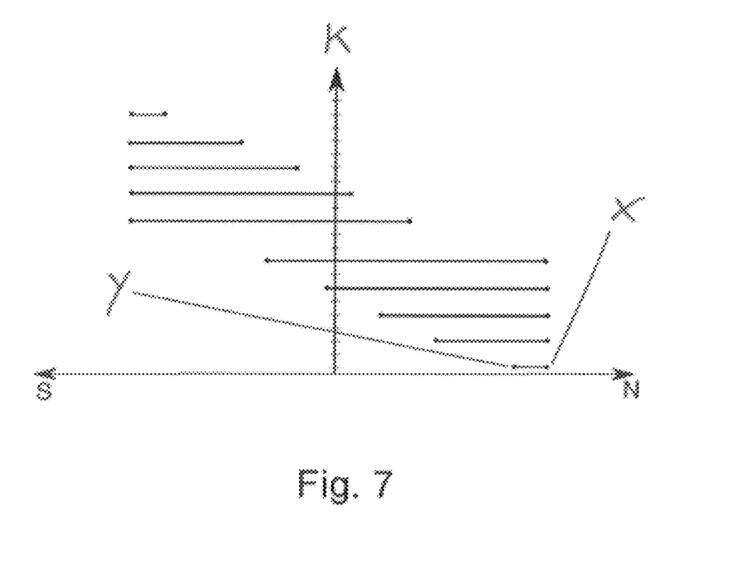
FIG. 7 shows a plot of different preferred diaphragm positions for different contrast settings which can be stored in a controller.

Different diaphragm positions, preferably stored and optionally storable in controller 160, for different magnifications V, and different contrast settings K, are depicted in FIGS. 6 and 7, respectively.

The movement and positioning of the diaphragm elements is usefully implemented with the aid of motors that possess a coding system. An alternative embodiment is the use of stepping motors that, by referencing, can arrive at a relative position with respect to a reference point. The position of the diaphragm elements relative to a local coordinate system (for example, the center of the flat panel light source) is advantageously stored in the controller as a parameter set for various magnifications, contrasting methods, objective settings, iris diaphragm settings, etc.

FIG. 6 depicts preferred exemplifying diaphragm settings for bright-field and oblique illumination along the x axis (which describes the N-S direction), as a function of magnification V on the y axis. The diaphragm settings are defined by the position of the aforementioned cutout points X, Y for bright-field illumination and X, Y' for oblique illumination. For low magnifications the cutout points are located relatively far apart, i.e. diaphragm dimension 156 in the N-S direction is large. For high magnifications the cutout points are located closer together, corresponding to a small diaphragm dimension 156. For bright-field illumination, the cutout points are usefully arranged symmetrically with respect to the W-E axis, corresponding in FIG. 6 to points X, Y that are each at the outer ends of the lines. The positions of cutout points X and Y, Y' of diaphragms 153 and 154 respectively are preferably defined by controller 160 in such a way that no vignetting of the object field occurs, and at the same time a reduction in the incident flare is achieved. The basis of this contrast setting is the diaphragm opening shape that is symmetrical with respect to the W-E direction or axis.

In the case of oblique illumination, one diaphragm element is usefully displaced more than the other, so that for oblique illumination the cutout points Y are displaced to Y'. The diaphragm opening is then arranged asymmetrically with respect to the W-E direction.

FIG. 7 depicts preferred exemplifying diaphragm settings along the x axis (which describes the N-S direction) for different contrast settings K on the y axis. Specifically, diaphragm settings for different oblique illuminations are depicted. From top to bottom, the illumination migrates from completely S to a greater proportion of N to completely N. A corresponding oblique illumination can be used, for example, to generate relief contrast images of the sample. It is particularly preferred if these settings are preassigned in the controller and can be retrieved by the user via an operating means. This embodiment is suitable in particular for situations in which no data from the microscope are available and/or automatic diaphragm setting is not desired.

The user is furthermore given the capability to influence the illumination. An arbitrary diaphragm setting is established, for example, by modifying adjustment parameters (e.g. with a rotary knob). This setting can be stored by the user in controller 160 and retrieved again later. A manually actuable, semi-automatic illumination control system can thereby be made available on the basis of the stored values.

FIG. 8a is a cross-sectional view of a portion of a first embodiment of a transillumination device, and FIG. 8b is a plan view of a portion of FIG. 8a.

The diaphragm elements are embodied here as flexible diaphragm curtains; in FIGS. 8a and 8b, only diaphragm curtain 153 is depicted, in section, along with aperture opening 153a. Diaphragm curtain 154 is correspondingly embodied, and would surround diaphragm curtain 153. Each of the diaphragm curtains is guided in endless fashion over two diaphragm element shafts 162, 163, the portion extending under the flat panel light source usefully being held together by means of spring elements 168. Cutout 153a is embodied here as a kind of hole in diaphragm curtain 153.

In this configuration, shaft 162 usefully carries (for example, toothed) drive pulleys 164 in order to move the circulating curtain 153, as well as idler pulleys 167 for second curtain 154. The other shaft 163 carries drive pulleys 166 for second curtain 154, as well as idler pulleys 165 for first curtain 153. Idler pulleys 165, 167 are free to rotate around the respective shaft. A drive system 161 such as, for example, a stepping motor is provided for each diaphragm element shaft 162, 163. Rotation of the diaphragm element shaft 162 and of drive pulleys 164 arranged nonrotatably thereon causes a displacement of diaphragm 153, and thus of cutout 153a, in a N-S direction. The same is true, mutatis mutandis, of diaphragm element shaft 163 and cutout 154a (not shown).

Alternatively, provision can be made that diaphragm elements 153 and 154, embodied as flexible diaphragm curtains, can be rolled onto and unrolled from a respective diaphragm element shaft that is in turn driven by a drive system such as, for example, a stepping motor. The rolling or unrolling then likewise results in a displacement of diaphragm 153 and thus of cutout 153a in a N-S direction.

FIGS. 9a and 9b schematically depict, in section, a corresponding portion of a transillumination device having rigid, plate-like diaphragm elements 153, 154. Diaphragm cutouts 153a, 154a together define diaphragm opening 155. The plate-like diaphragm elements can also be displaced by means of diaphragm element shafts and drive systems in a N-S direction, although in FIGS. 9a and 9b only one diaphragm element shaft 162 for diaphragm elements 153, as well as one drive system 161, are depicted. A counter-pressure element (e.g. a pulley or roller) (not depicted) is usefully provided for each diaphragm element shaft.

The use of stepping motors as a drive system is advantageous In a context of minimization of the installation space (height and lateral dimension) required for the transillumination device as a whole. The diaphragm elements are moved by means of the drive system via the diaphragm element shaft. Optimization of the installation space can be realized in particular by means of the embodiment in FIG. 8, in which the diaphragm elements are embodied flexibly and are guided around the diaphragm element shaft. This reduces the lateral dimension of the transillumination device.

Figure 10A:
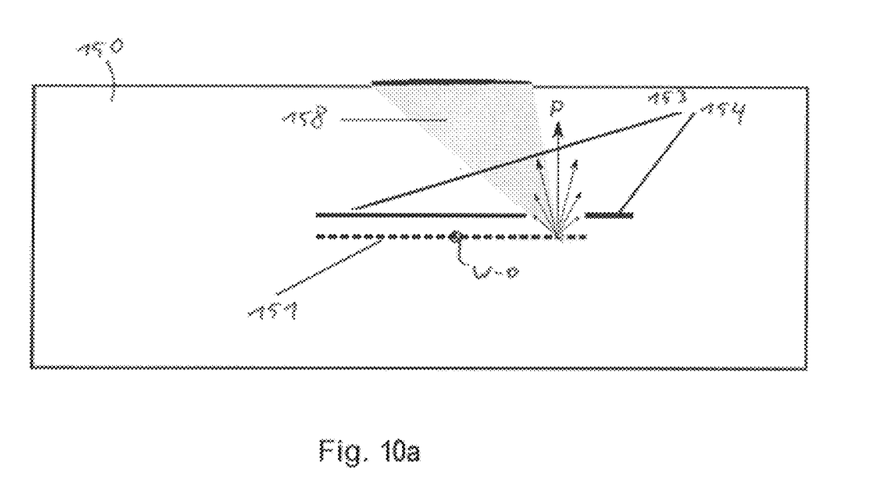
FIG. 10a is a schematic side view of a preferred embodiment of a transillumination device according to the present invention with an untilted flat panel light source.
Figure 10B:
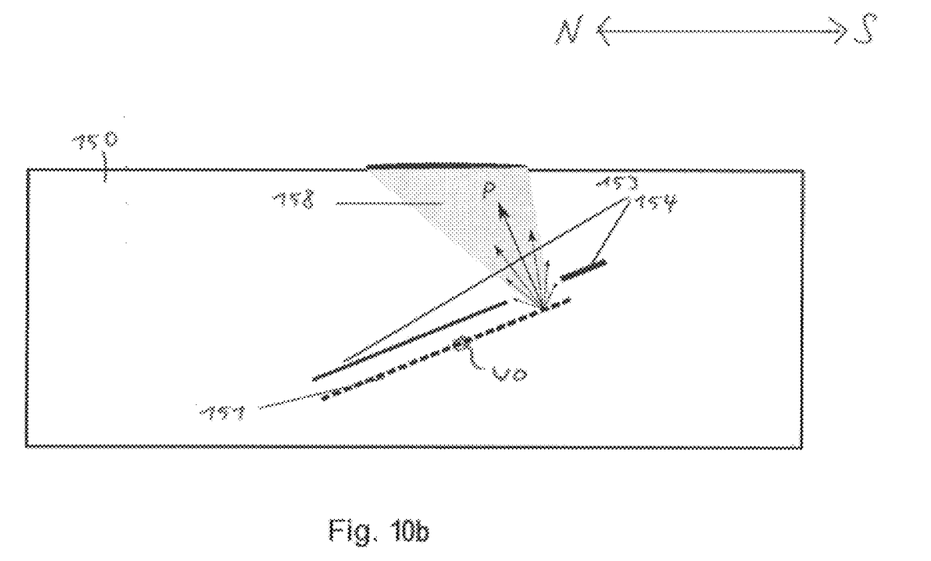
FIG. 10b is a schematic side view of the transillumination device in accordance with FIG. 10a with a tilted flat panel light source.

FIGS. 10a and 10b depict the tilting of a flat panel light source having a diaphragm arrangement, illustrating in each case illumination device 150 in a cross-sectional view along the N-S direction, flat panel light source 151 being mounted tiltably or rotatably around the W-E direction.

In the case of the untilted flat panel light source 151 in accordance with FIG. 10a, the result of an oblique illumination (as illustrated) is that illumination center point P is not located inside illumination cone 158.

The illumination can therefore be improved if flat panel light source 151 is tilted, as shown in FIG. 10b, so that illumination center point P, i.e. the center point of the illumination intensity, is now located inside illumination cone 158. The result is that an additional increase in contrast is achieved, in particular in the case of oblique illumination.

Figure 11:
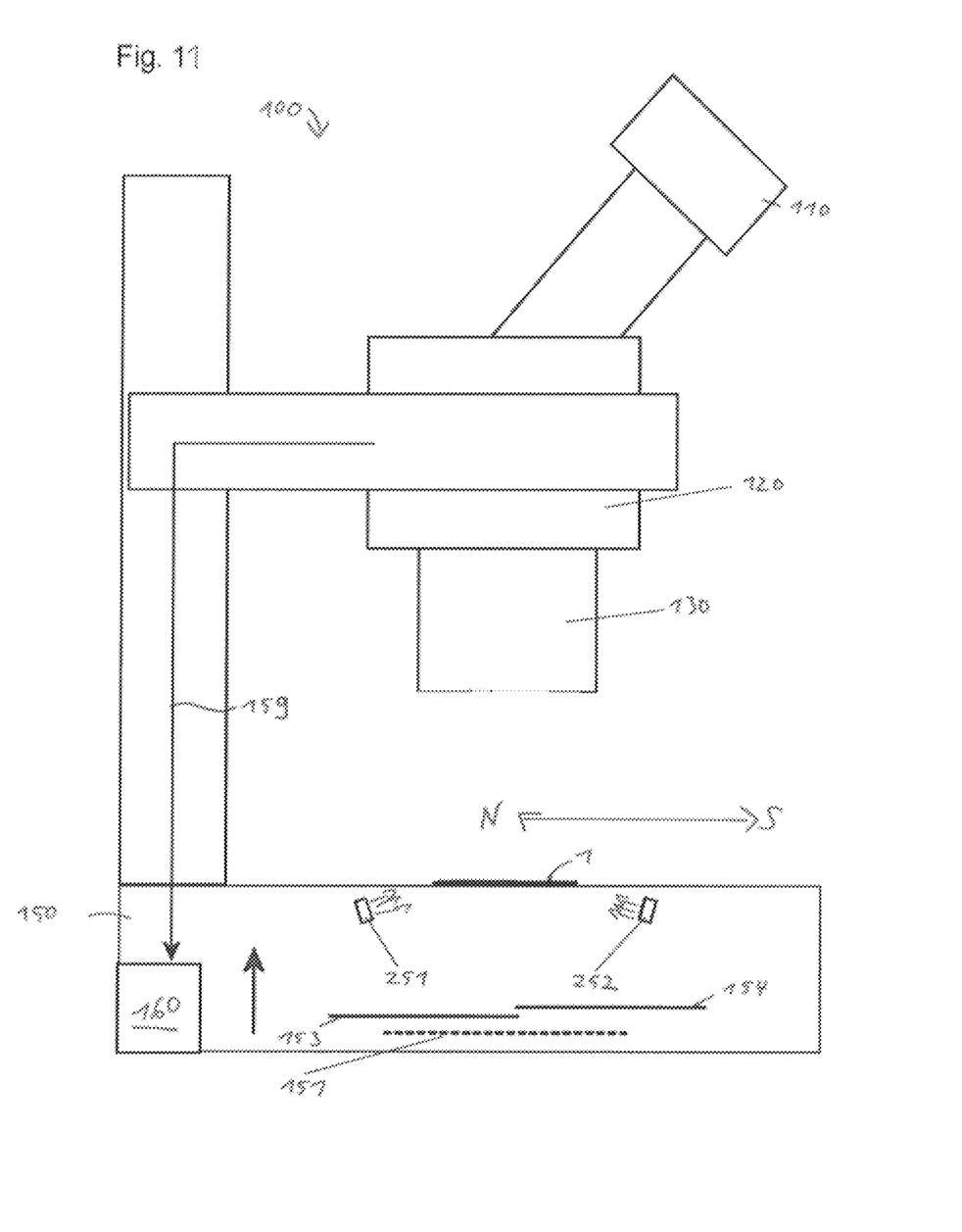
FIG. 11 is a schematic sectioned view of the circumstances in the context of dark-field illumination in a microscope according to the present invention.

FIG. 11 depicts a preferred embodiment of a microscope 100 according to the present invention that possesses a preferred embodiment of a transillumination device 150. Transillumination device 150 has, above the two diaphragm elements 153, 154 and in addition to the elements already explained hitherto, a dark-field illumination device that comprises light-emitting elements such as, for example, LEDs 251 and 252. These can be embodied, as linear LED arrays and can be switched on individually or together in order to implement one-sided or two-sided dark-field illumination.

Light-emitting elements 251, 252 of the dark-field illumination device emit light outside the observation aperture of objective 130, so that they do not contribute to direct illumination. Instead, the light proceeding from the dark-field illumination system is scattered at the object and introduced into the microscope. The diaphragm opening is preferably closed when dark-field illumination is used, in order to increase contrast. On the one hand this causes flat panel light source 151, which may fluoresce and/or reflect because of the dark-field illumination, to be covered, and on the other hand the surface of diaphragm elements 153, 154 facing toward sample 1 is highly absorbent in order to minimize possible back-scattering. Closing is usefully accomplished automatically, by controller 160, when the dark-field illumination system is put into service.

Figure 12A:
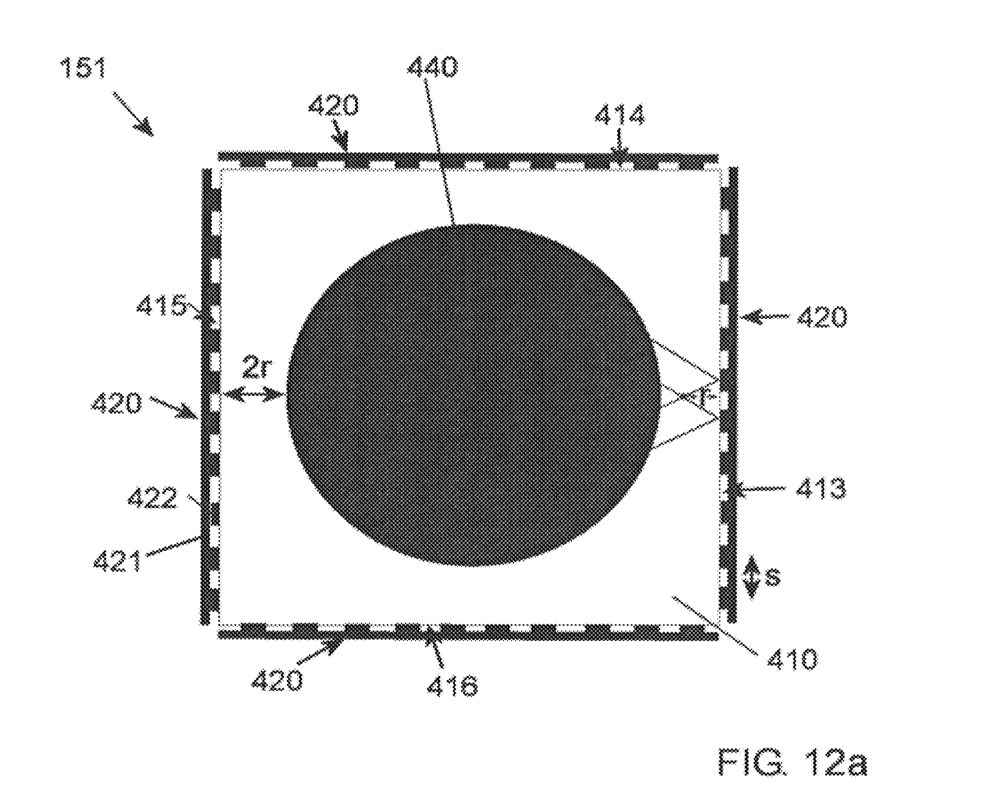
FIG. 12a is a plan view of a preferred embodiment of a flat panel light source suitable for the invention.
Figure 12B:
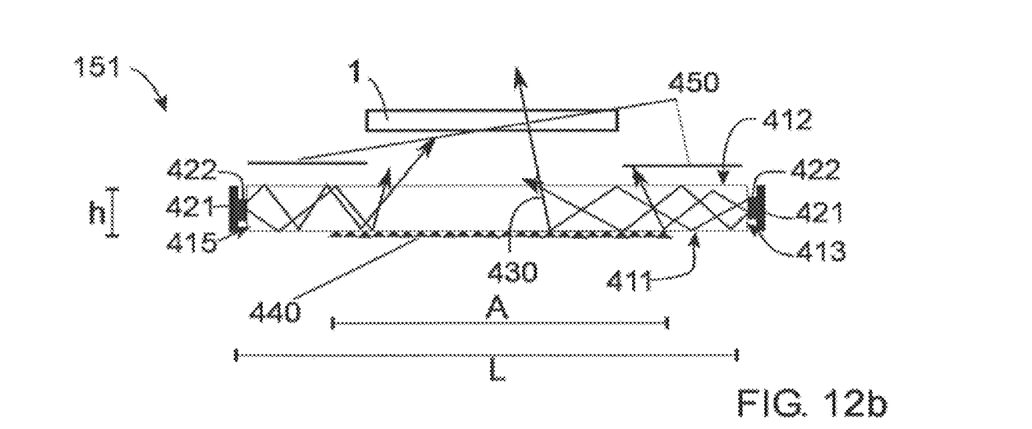

FIGS. 12a and 12b, which depict a flat panel light source 151 respectively in a plan view and a cross-sectional view, will be described below in continuous and overlapping fashion.

Flat panel light source 151 comprises a plate-shaped light guide 410. The plate-shaped light guide is made, for example, of acrylic, glass, or the like and here has the shape of a prism, specifically a cuboid. Plate-shaped light guide 410 encompasses a lower (in this case, square) boundary surface 411 and a congruent upper boundary surface 412. Light guide 410 has a lateral extension L and a height h, such that preferably h<0.1 L.

Light guide 410 furthermore comprises four side surfaces 413 to 416. In the present example, light-emitting means 420 are coupled onto all side surfaces 413 to 416. Light-emitting means 420 encompass a carrier 421, serving simultaneously as a heat sink, on which are arranged a number of light-emitting elements embodied here as light-emitting diodes 422. Light-emitting diodes 422 are arranged on light guide 410 in such a way that light 430 radiated from light-emitting diodes 422 propagates in the light guide as a result of total reflection. Light-emitting diodes 422 are at a distance s from one another.

Located at lower boundary surface 411 is an element 440 that disrupts total reflection and is embodied in the present example in circular fashion. Be it noted that a rectangular configuration is also preferred. The abutting region is referred to as a "contact surface" and has a planar area that is smaller than planar area $L^2$ of lower boundary surface 411. In particular, the contact surface is at a distance 2r from the lateral surfaces serving as entrance surfaces, which distance is preferably determined as follows:

In the light guide, the incoupled light is refracted by the refractive index n toward the vertical. A superposition of the incoupled light of adjacent light-emitting diodes thus takes place only starting at a distance $r=s/2*\sqrt{(n^2-1)}$ from the edge of the light guide (cf. FIG. 12a). It is therefore advantageous to provide a total-reflection region at the edge of the plate so that good intermixing is achieved. Because of the non-isotropic angular characteristic of the light-emitting means, a width of at least 2r is typically provided for the edge zone.

The cuboidal shape of light guide 410 makes possible particularly simple handling and attachment of light-emitting means 420, since lateral surfaces 413 to 416 are flat.

In the present example, irradiation of light 430 occurs at all four lateral surfaces 413 to 416, so that for purposes of the invention an irradiation of light occurs from four different directions. Although in a technical sense each of the individual light-emitting diodes 422 radiates in infinitely many directions, "irradiation from different directions" is to be understood for purposes of the invention to mean that the principal radiating directions of the light-emitting means are different. In this sense, in this case all the light-emitting diodes 422 of a light-emitting means 420 that is arranged on one of lateral surfaces 413 to 416 radiate in the same direction.

Element 440 that disrupts total reflection is embodied, in the example depicted, as a microprism plate that is mounted with transparent adhesive on lower boundary surface 411 of light guide 410. A bonded-on, structured film is likewise a preferred possibility. Element 440 comprises flanks that usefully are mirror-coated, so that the majority of the incident light is reflected and is not lost. The reflectance is preferably above 90%. The geometry of the microstructure influences the angular characteristic of the outcoupled light bundle.

The mirror-coated microprism plate 440 is connected by means of the adhesive to light guide 410, the optical refractive index of the adhesive being selected so that the angular range that is transported by design in the light guide is outcoupled toward the sample. The result is that light 430 incident onto element 440 is reflected in an upward direction, such that a portion leaves light guide 410 at upper boundary surface 412 and can be used for transillumination of a sample 1 arranged thereabove.

Element 440 that disrupts total reflection can, in similarly preferred fashion, produce diffuse scattering and can for that purpose, for example, be a paste applied onto lower boundary surface 411. It can also be a bonded-on film. Element 440 is usefully substantially opaque, so that the majority of the incident light is not transmitted but instead is reflected and is not lost. The reflectance factor is preferably above 0.9. Element 440 is light in color, e.g. white or beige, and acts as a diffuse scattering surface. The result is that light 430 incident onto element 440 is diffusely reflected or scattered upward, such that a portion leaves light guide 410 at upper boundary surface 412 and can be used for transillumination of a sample 1 arranged thereabove.

A diaphragm, configured here as an aperture 450, is provided above upper boundary surface 412. The side of diaphragm 450 facing toward upper boundary surface 412 is mirror-coated.

What is claimed is:

1. A transillumination device (150) for illuminating an objective field of a microscope (100) having an objective (130), comprising:
    a flat panel light source (151);
    a diaphragm arrangement (152), arranged behind the flat panel light source (151) in a radiating direction (AR), the diaphragm arrangement including two diaphragm elements (153, 154) movable relative to one another;
    wherein at least one of the two diaphragm elements (153, 154) comprises a cutout (153a, 154a);
    the two diaphragm elements (153, 154) defining, together with the at least one cutout (153a, 154a), a non-pinhole diaphragm opening (155);
    wherein the dimensions (156, 157) of the diaphragm opening (155) in two mutually perpendicular directions are determined by a position of the diaphragm elements (153, 154) relative to one another; and
    wherein the transillumination device is disposed on an opposite side of the object field relative to the objective (130).

2. The transillumination device (150) according to claim 1, wherein the relative position of the two diaphragm elements (153, 154) is adjustable by moving at least one of the two diaphragm elements (153, 154) along a first movement direction (N-S).

3. The transillumination device (150) according to claim 2, wherein the at least one cutout (153a, 154a) is shaped so that upon a change in the relative position of the diaphragm elements (153, 154) by moving at least one of the two diaphragm elements (153, 154) along the first movement direction (N-S), the dimension (156) of the diaphragm opening in the first movement direction (N-S) is modified more greatly than the dimension (157) in a second direction (W-E) oriented perpendicular thereto.

4. The transillumination device (150) according to claim 2, wherein at least one said cutout (153a, 154a) tapers along the first movement direction (N-S).

5. The transillumination device (150) according to claim 2, wherein at least one said cutout (153a, 154a) is symmetrical to an axis extending in the first movement direction (N-S).

6. The transillumination device (150) according to claim 1, wherein said at least one cutout (153a, 154a) is at least locally concave, circular, parabolic, or hyperbolic.

7. The transillumination device (150) according to claim 1, wherein the two diaphragm elements (153, 154) are embodied as flexible diaphragm curtains.

8. The transillumination device (150) according to claim 1, further comprising at least one diaphragm element shaft (162, 163) for bringing about the relative movement of the two diaphragm elements (153, 154).

9. The transillumination device (150) according to claim 8, wherein the two diaphragm elements (153, 154) are relatively movable by operation of the at least one diaphragm element shaft (162, 163) into a relative position that defines, with respect to a center of the flat panel light source, an asymmetrical diaphragm opening (155).

10. The transillumination device (150) according to claim 1, wherein the flat panel light source (151) comprises:
- a plate-shaped light guide (410) having a lower boundary surface (411), an upper boundary surface (412), and at least one lateral surface (413 to 416);
- at least one light-emitting means (420, 422) arranged to radiate light (430) into the light guide (410) from at least two different directions, via at least one lateral surface serving as a light entrance surface, wherein the light propagates in the light guide (410) as a result of total reflection; and
- an element (440) abutting against a contact surface at the lower boundary surface (411) of the light guide (410), wherein the element disrupts the total reflection such that an outcoupling of light occurs through the upper boundary surface (412) of the light guide (410);
- wherein a planar area of the contact surface is less than a planar area of the lower boundary surface (411).

11. The transillumination device (150) according to claim 10, wherein the element (440) that disrupts total reflection produces a diffuse scattering or a directed reflection of the light (430) propagating in the light guide (410).

12. The transillumination device (150) according to claim 1, further comprising a dark-field illumination device (251, 252) arranged behind the diaphragm arrangement (152) in the radiating direction (AR).

13. The transillumination device (150) according to claim 1, wherein the flat panel light source (151) is tiltably mounted.

14. The transillumination device (150) according to claim 1, further comprising a controller (160) and at least one drive system (161) configured to bring about the relative movement of the diaphragm elements (153, 154).

15. The transillumination device (150) according to claim 14, further comprising an operating means connected to the controller (160), the controller being configured to shift the diaphragm elements (153, 154) into a specific position relative to one another upon an actuation of the operating means.

16. A microscope (100) having a transillumination device (150), comprising:
- an objective (130);
- an objective field viewed through the objective (130);
- a flat panel light source (151);
- a diaphragm arrangement (152), arranged behind the flat panel light source (151) in a radiating direction (AR), the diaphragm arrangement including two diaphragm elements (153, 154) movable relative to one another;
- wherein at least one of the two diaphragm elements (153, 154) comprises a cutout (153a, 154a);
- the two diaphragm elements (153, 154) defining, together with the at least one cutout (153a, 154a), a non-pinhole diaphragm opening (155);
- wherein the dimensions (156, 157) of the diaphragm opening (155) in two mutually perpendicular directions are determined by a position of the diaphragm elements (153, 154) relative to one another; and
- wherein the transillumination device is disposed on an opposite side of the object field relative to the objective (130).

17. The microscope according to claim 16, wherein the microscope is a zoom microscope.

18. The microscope according to claim 16, wherein the microscope is a stereomicroscope.

19. The microscope (100) according to claim 16, further comprising a controller (160) and at least one drive system (161) configured to bring about the relative movement of the diaphragm elements (153, 154), wherein the controller (160) is configured to shift the diaphragm elements (153, 154) into a specific position relative to one another as a function of a setting of the microscope (100).

20. The microscope (100) according to claim 19, wherein the controller (160) is configured to shift the diaphragm elements (153, 154) into a specific position relative to one another as a function of a magnification setting, an objective setting, and/or an iris diaphragm setting of the microscope (100).

21. A macroscope (100) having a transillumination device (150), comprising:
- an objective (130);
- an objective field viewed through the objective (130);
- a flat panel light source (151);
- a diaphragm arrangement (152), arranged behind the flat panel light source (151) in a radiating direction (AR), the diaphragm arrangement including two diaphragm elements (153, 154) movable relative to one another;
- wherein at least one of the two diaphragm elements (153, 154) comprises a cutout (153a, 154a);
- the two diaphragm elements (153, 154) defining, together with the at least one cutout (153a, 154a), a non-pinhole diaphragm opening (155);
- wherein the dimensions (156, 157) of the diaphragm opening (155) in two mutually perpendicular directions are determined by a position of the diaphragm elements (153, 154) relative to one another; and
- wherein the transillumination device is disposed on an opposite side of the object field relative to the objective (130).

* * * * *